July 30, 1929.    A. C. ROSS    1,722,596

FISHWAY

Filed Jan. 21, 1929

INVENTOR
ALBERT C. ROSS
BY C. F. Blake
ATTY.

Patented July 30, 1929.

1,722,596

UNITED STATES PATENT OFFICE.

ALBERT C. ROSS, OF PORTLAND, OREGON.

FISHWAY.

Application filed January 21, 1929. Serial No. 333,863.

My invention relates to fishways in general, and particularly to such fish ways as are used to allow the young fish to pass down stream beyond an obstruction, such as a dam or the like. The object of my invention is to provide such a device without moving parts that have to be powered from some outside source, and that is simple and economical in use, and effectively accomplishes its function. I accomplish this object by means of the construction illustrated in the accompanying drawing, which is a part of this application for Letters Patent, like characters indicating like parts throughout the several views thereof, and in which:

Fig. 1 is a sectional elevation of a dam with my device installed thereupon.

Fig. 2 is a plan view of the same.

In general my device consists of a hollow flume passing from one side of the dam to the other, preferably through the dam structure, a float to support the upper end of said flume, articulated joints in said flume, and a turbine propelled pump operated by water taken from said flume and adapted to discharge a stream of water adjacent the upper end of said flume for decoy purposes.

The central portion of the flume 3 is preferably passed through the dam 4, although it may be placed to one end of the dam if desired, and the lower end of the flume 5 discharges into the down stream portion of the stream through an enlarged mouth 6. The upper portion of the flume is divided into several portions 7 connected by articulated or ball joints 8 to allow for the rise and fall of the water above the dam 4. The last length of the upper portion of the flume terminates upstream in an enlarged intake mouth 9, as shown in Fig. 1, and attached to said last length adjacent said intake mouth is a float 10 adapted to support the intake end of the flume.

It is a well known fact that fish are attracted by falling water, and to provide such attraction adjacent the intake mouth of the flume I provide a turbine 11 operated by water taken from the flume through a pipe 12, and mounted upon the turbine shaft 13 is a pump 14, adapted to take water from the stream through an intake pipe 15 and deliver the same through a pipe 16 to a point 17 directly above the intake mouth 9 of the flume. Said pipe 16 is provided with articulated or ball joints 18 similar to those of the flume portions 7.

Arms 19 are provided upon the float 10 for the purpose of serving as fastenings for ropes or chains with which the float may be anchored in position.

My device may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. In a fishway: a flume, passing from one side to the other of an obstruction in a stream; articulated joints in the upstream portion of said flume; and a float upon the upstream end of said flume.

2. In a fishway: a flume passing from one side to the other of an obstruction in a stream; articulated joints in the upstream portion of said flume; and means to support the upstream end of said flume.

3. In a fishway: a flume passing from one side to the other of an obstruction in a stream; means to support the upstream end of said flume; and means for discharging a stream of water adjacent the upstream end of said flume for the purpose of attracting fish into said flume.

4. In a fishway: a flume passing from one side to the other of an obstruction in a stream; a turbine operated by water from said flume; a pump operated by said turbine, and a pipe from said pump discharging a stream of water adjacent the upstream end of said flume.

5. In a fishway: a flume passing from one side to the other of an obstruction in a stream; articulated joints in the upstream portion of said flume; a float to support the upstream end of said flume; a turbine operated by water from said flume; a pump operated by said turbine; a discharge pipe from said pump to deliver a stream of water adjacent the upstream end of said flume; and articulated joints in said discharge pipe.

In witness whereof I claim the foregoing as my own I hereto affix my signature at Portland, county of Multnomah, State of Oregon, this 15th day of Jan. 1929.

ALBERT C. ROSS.